US012183318B1

(12) United States Patent
Tejada

(10) Patent No.: US 12,183,318 B1
(45) Date of Patent: Dec. 31, 2024

(54) ROTATING NOISE MAKING DEVICE

(71) Applicant: Ramon Tejada, Vinton, TX (US)

(72) Inventor: Ramon Tejada, Vinton, TX (US)

( * ) Notice: Subject to any disclaimer, the term of this patent is extended or adjusted under 35 U.S.C. 154(b) by 216 days.

(21) Appl. No.: 17/882,116

(22) Filed: Aug. 5, 2022

(51) Int. Cl.
*A63H 5/00* (2006.01)
*G10K 3/00* (2006.01)

(52) U.S. Cl.
CPC *G10K 3/00* (2013.01); *A63H 5/00* (2013.01)

(58) Field of Classification Search
CPC ........................................................ A63H 5/00
See application file for complete search history.

(56) References Cited

U.S. PATENT DOCUMENTS 922,672 A * 5/1909 Leedy et al. .............. B41L 1/22 24/DIG. 8
1,173,141 A * 2/1916 Bartholome ............. A63H 5/00 446/420
1,693,140 A * 11/1928 Dietze, Jr. ................ A63H 5/00 43/42.31
1,742,158 A * 12/1929 Otterbein ................. A63H 5/00 446/420
2,093,055 A * 9/1937 Pellizzari ................. G10K 3/00 446/420
6,817,922 B1 11/2004 Davies
7,252,571 B1 * 8/2007 Bohman ............. A01M 31/004 446/421
7,572,966 B1 8/2009 Frigo et al.

* cited by examiner

*Primary Examiner* — John A Ricci
(74) *Attorney, Agent, or Firm* — Sanchelima & Associates, P.A.; Jesus Sanchelima; Christian Sanchelima

(57) ABSTRACT

A rotating noise making device including a handle assembly, a housing assembly, and a rotating mechanism assembly. The handle assembly includes a rod and a handle. The rod is fixed to the handle. The housing assembly includes a first enclosing element and a second enclosing element. The first enclosing element and the second enclosing element are rotatably and perpendicularly attached to the rod. The rotating mechanism assembly includes a rotating mechanism. The rotating mechanism assembly includes a rotating mechanism, the rotating mechanism is attached to the handle. The rotating mechanism is actuated to produce noise when a user elliptically moves the handle.

7 Claims, 3 Drawing Sheets

ROTATING NOISE MAKING DEVICE

BACKGROUND OF THE INVENTION

1. Field of the Invention

The present invention relates to a rotating noise making device and, more particularly, to a rotating noise making device that allows to create noise by rotating a housing over its own axis using a rotating mechanism.

2. Description of the Related Art

Several designs for noise making devices have been designed in the past. None of them, however, include the use of used hockey pucks for creating a housing for the noise making device.

Applicant believes that a related reference corresponds to U.S. Pat. No. 7,572,966 issued for a themed handheld personal noisemaking instrument. Applicant believes that another related reference corresponds to U.S. Pat. No. 6,817,922 issued for a noise maker configured as a sport article. None of these references, however, teach of a noise making device constructed with used hockey pucks and a handle, the noise making device including a rotating mechanism which is actuated by hand motion to produce noise.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a rotating noise making device that includes a rotating mechanism which produces sound when a rotating element rotates around it.

It is another object of this invention to provide a rotating noise making device that includes a handle which allows to hold the invention and actuate the rotating mechanism.

It is still another object of the present invention to provide a rotating noise making device that includes the use of repurposed materials to help in lower waste created from discarded sporting equipment.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
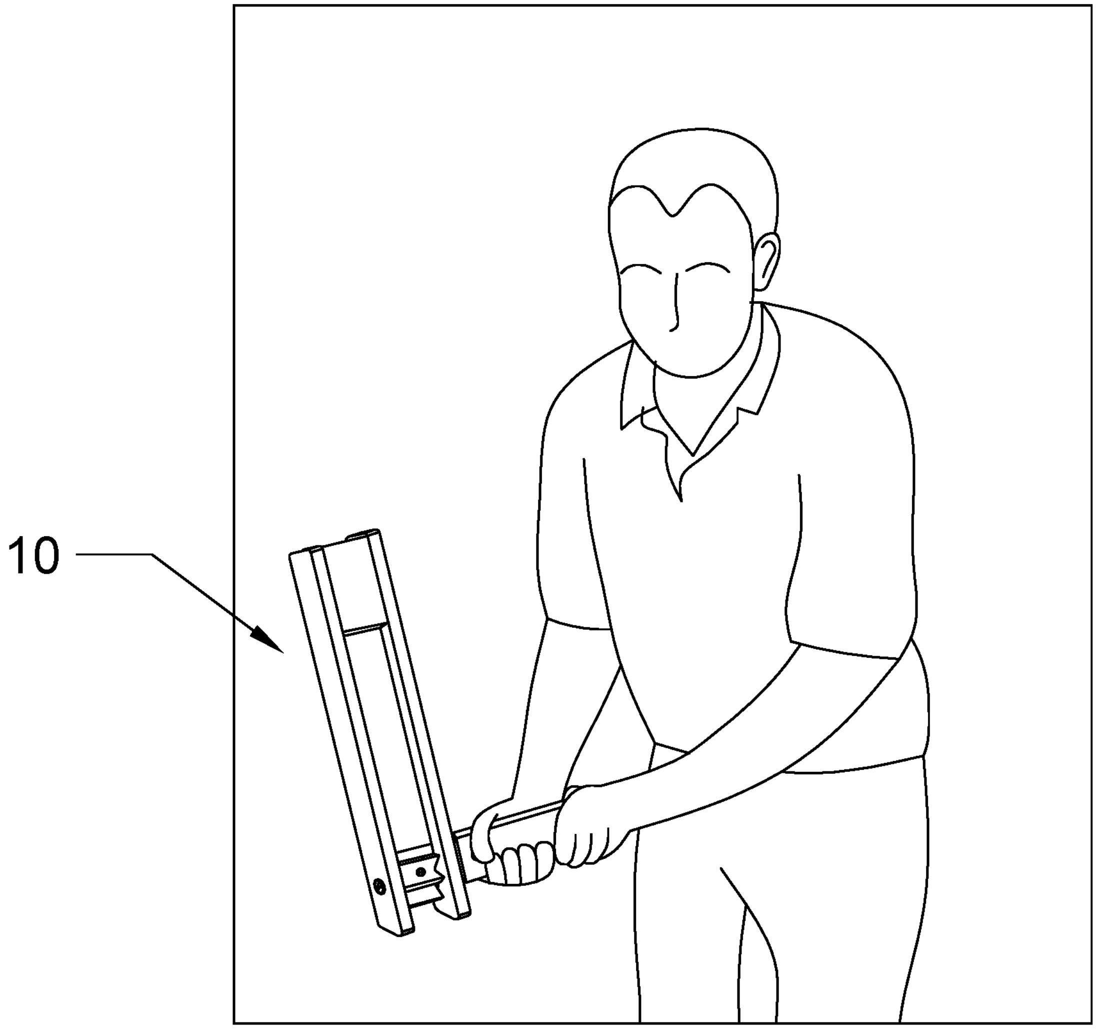
FIG. 1 represents an isometric operational view of the present invention 10 being actuated by a user to produce sound.
Figure 2:
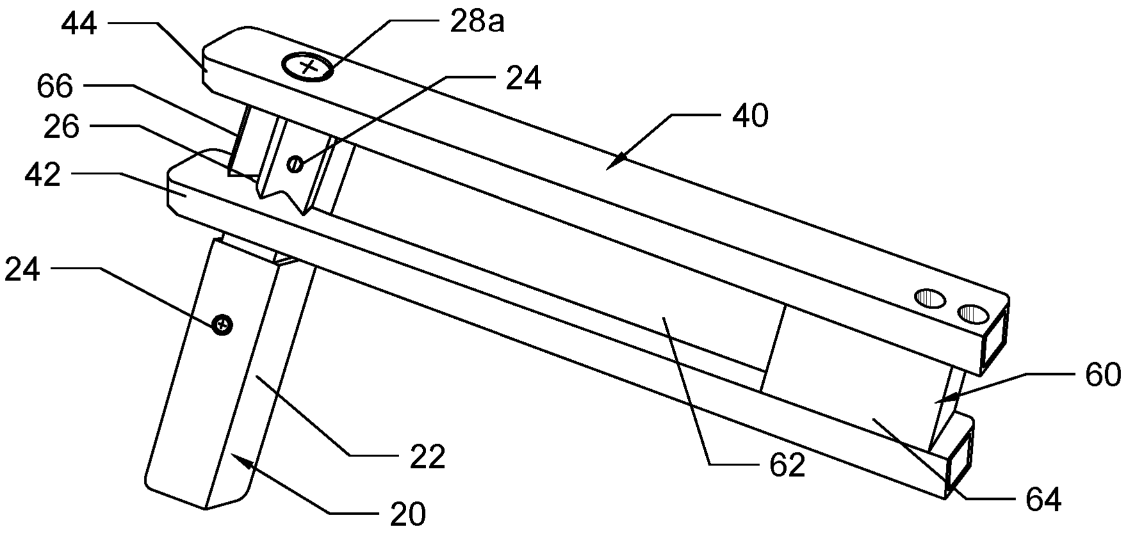
FIG. 2 shows an isometric view of the present invention 10. The present invention includes a handle assembly 20, a housing assembly 40 and a rotating mechanism assembly 60.
Figure 3:
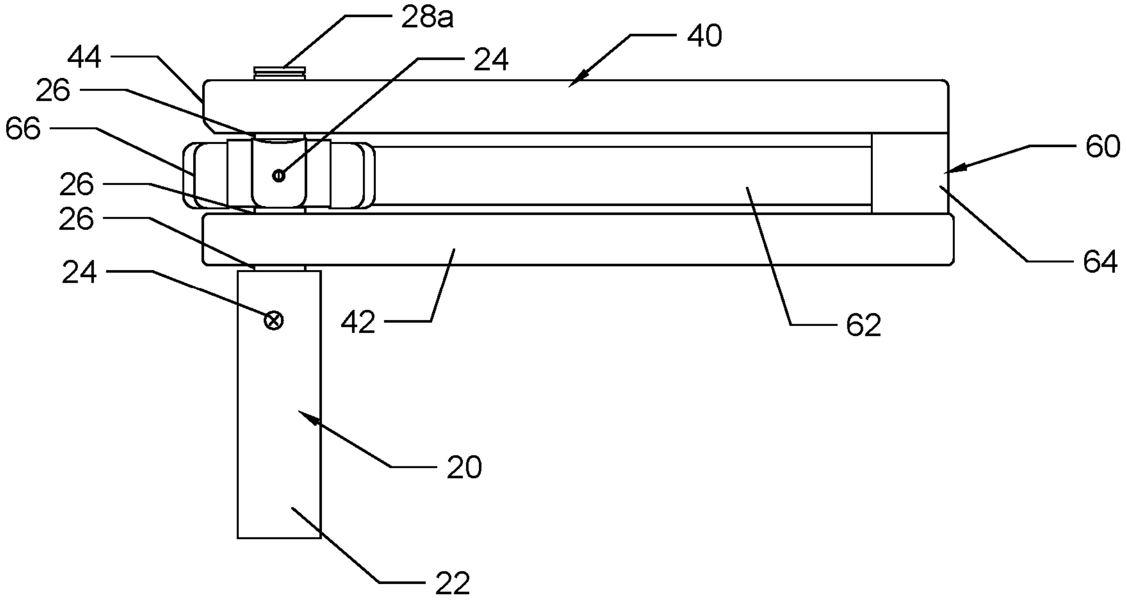
FIG. 3 illustrates a left side view of the present invention 10.
Figure 4:
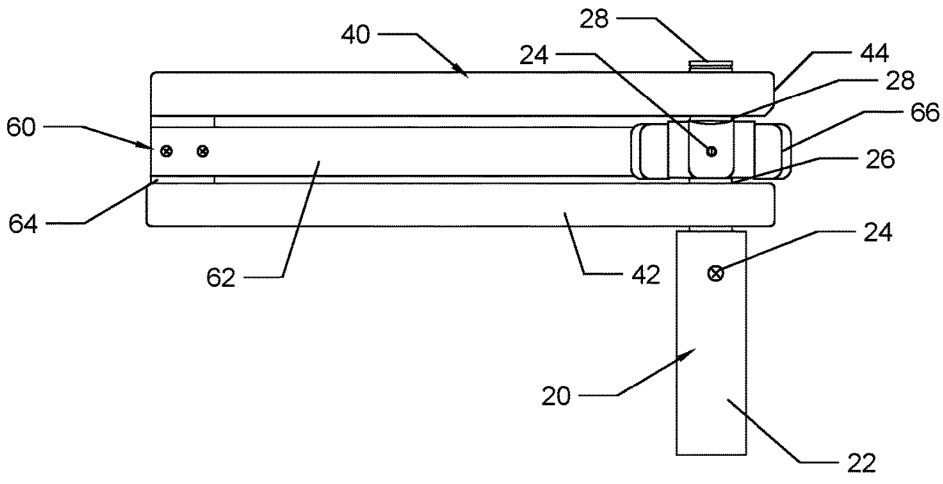
FIG. 4 is a representation of a right-side view of the present invention 10.
Figure 5:
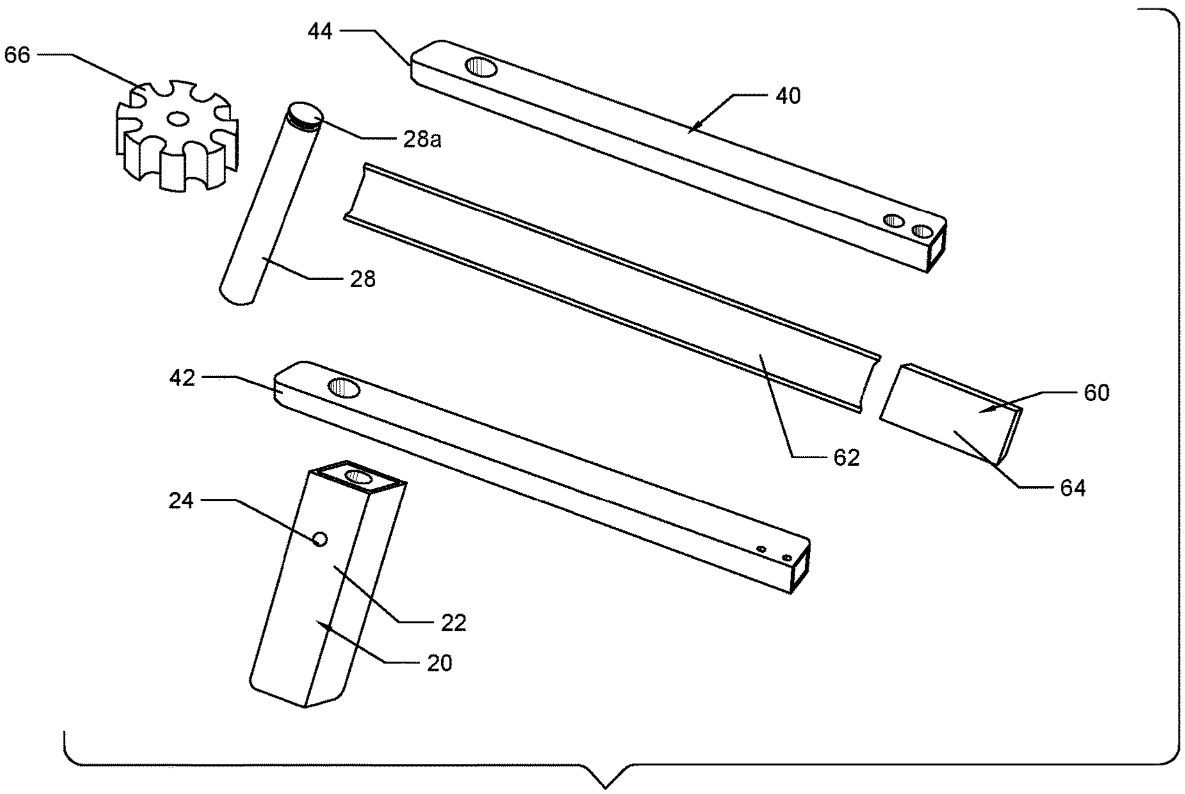
FIG. 5 depicts an exploded view of the present invention 10.

Referring now to the drawings, where the present invention is generally referred to with numeral 10, it can be observed that it basically includes a handle assembly 20, a housing assembly 40 and a rotating mechanism assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The handle assembly 20 may include a handle 22, screws 24 and a rod 28. The handle 22 may have a rectangular shape. It also may be suitable for the handle 22 to have a cylindrical shape, a triangular shape, or any other suitable shape. The handle 22 may be made of metal. It also may be suitable for the handle 22 to be made of plastic, wood, or any other suitable material. In a preferred embodiment the handle 22 may be made of used hockey sticks. The handle 22 may have an opening on the top. The rod 28 may be coupled into the opening of the handle 22. The rod 28 may be fixed to the handle 22 through one of the screws 24 that transversally goes through one of the sides of the handle 22 and the rod 28. The rod 28 may have a cylindrical shape. The rod 28 may be made of used materials. The rod 28 may be made of metal. It also may be suitable for the rod 28 to be made of plastic, wood, or any other suitable material. The rod 28 may transversely go through the housing assembly 40. The rod 28 may include a securing element **28*a* in the top to ease the rotation of the housing assembly 40 around the rod 28. The securing element 28*a* may also prevent the housing assembly 40 from being disengaged from the rod 28**.

The housing assembly 40 may include a first enclosing element 42 and a second enclosing element 44. The first enclosing element 42 may have a cuboid elongated shape with rounded corners, it also may be suitable for the first enclosing element 42 to have a circular shape, a rectangular shape, or any other suitable shape. The second enclosing element 44 may have a cuboid elongated shape with rounded corners, it also may be suitable for the second enclosing element 44 to have a circular shape, a rectangular shape, or any other suitable shape. The first enclosing element 42 and the second enclosing element 44 may be made of metal. Preferably, the first enclosing element 42 and the second enclosing element 44 may be made of used hockey sticks. It also may be suitable for the first enclosing element 42 and the second enclosing element 44 to be made of plastic, wood, or any other suitable material. The first enclosing element 42 and the second enclosing element 44 may have an opening in a proximal end.

The rod 28 may be inserted through the opening in the proximal end of the first enclosing element 42 and the second enclosing element 44. The first enclosing element 42 and the second enclosing element 44 may be parallelly located and separated a predetermined distance one of the other. The first enclosing element 42 and the second enclosing element 44 may be perpendicular to the rod 28. The first enclosing element 42 and the second enclosing element 44 may rotate around the rod 28. It may be suitable for the rod 28 to include washers or slip rings to allow rotatably of the first enclosing element 42 and the second enclosing element 44 around the rod 28.

The rotating mechanism assembly 60 may include a rectangular element 62, a fixing element 64 and a central element 66. The distal end of the first enclosing element 42 and the distal end of the second enclosing element 44 may be attached together through the fixing element 64. The fixing element 64 may have a rectangular elongated shape. It also may be suitable for the fixing element 64 to have a triangular shape, a circular shape, a trapezoid shape, an oval shape, or any other suitable shape. The fixing element may be made of metal, plastic, wood, or any other suitable material. In a preferred embodiment the fixing element 64 may be made of used hockey sticks. The rectangular element 62 may be made attached to the rectangular element 64 through screws 24. The rectangular element 62 may have a rectangular shape. The rectangular element 62 may be made of metal, plastic, wood, or any other suitable material. The rectangular element 62 may diagonally extend between the first enclosing element 42 and the second enclosing element 44. The rectangular element 62 may be attached to the first enclosing element 42 and the second enclosing element 44. The rectangular element 62 may be smaller in width than height and length. The rectangular element 62 may rotate along with the first enclosing element 42 and the second enclosing element 44 around the rod 28.

The central element 66 may be fixed to the rod 28 through one of the screws 24. The central element 66 may be a circular element having indentations disposed about a lateral surface wherein the indentations extend radially. It also may be suitable for the central element 66 to have a rectangular shape or any other suitable shape. A part of the proximal end of the rectangular element 62 may be partially inserted into the indentations of the central element 66. The rectangular element 62 may rotate along with the first enclosing element 42 and the second enclosing element 44 around the central element 66. When rotating around the central element 66 the rectangular element 42 may hit the inner walls of the indentations of the central element 66 producing noise. A user may elliptically move the handle 22 to make the housing assembly 40 and the rectangular element to rotate around the rod 28 and the central element 66 to produce noise.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A rotating noise making device, comprising:

a handle assembly, wherein said handle assembly includes a handle and a rod, wherein said rod is fixed to said handle;

a housing assembly, wherein said housing assembly includes a first enclosing element and a second enclosing element, said first enclosing element, and said second enclosing element are rotatably and perpendicularly attached to said rod; and a rotating mechanism assembly, wherein said rotating mechanism assembly includes a rotating mechanism, said rotating mechanism is attached to said handle, said rotating mechanism is actuated to produce noise when elliptically moving said handle, wherein said rotating mechanism includes a rectangular element and a central element, wherein said central element is fixed to said rod, said rectangular element is fixed between said first enclosing element and said second enclosing element wherein said rectangular element is fixed between said first enclosing element and said second enclosing element by means of a fixing element, wherein said first enclosing element is attached to a bottommost end of said fixing element, said second enclosing element is attached to an uppermost end of said fixing element and said rectangular element is attached to a lateral side of said fixing element.

2. The rotating noise making device set forth in claim 1, wherein said central element is a circular element having indentations disposed about a lateral surface, wherein said indentations extend radially, wherein said rectangular element hits an inner wall of said indentations when is rotated to produce noise.

3. The rotating noise making device set forth in claim 1, wherein said first enclosing element is parallel to said second enclosing element, wherein said first enclosing element and said second enclosing element are rotatably attached to said rod separated a predetermined distance one of the other.

4. The rotating noise making device set forth in claim 1, wherein said first enclosing element and said second enclosing element have a cuboid elongated shape.

5. The rotating noise making device set forth in claim 1, wherein said first enclosing element, said second enclosing element and said handle are made of used hockey sticks.

6. The rotating noise making device set forth in claim 1, wherein said central element is made of a hockey puck.

7. A rotating noise making device, consisting of:

a handle assembly, wherein said handle assembly includes a handle and a rod, wherein said rod is fixed to said handle;

a housing assembly, wherein said housing assembly includes a first enclosing element and a second enclosing element, said first enclosing element, and said second enclosing element are rotatably and perpendicularly attached to said rod, said first enclosing element and said second enclosing element are parallel and separated a predetermined distance one of the other, said first enclosing element and said second enclosing element are made of used hockey sticks, said first enclosing element and said second enclosing element have cuboid elongated shape, wherein a distal end of said first enclosing element is attached to a distal end of said second enclosing element by means of a fixing element; and a rotating mechanism assembly, wherein said rotating mechanism assembly includes a rectangular element and a central element, wherein said central element is fixed to said rod, said rectangular element is fixed between said first enclosing element and said second enclosing element, said rectangular element is fixed to a lateral side of said fixing element, wherein said central element is a circular element having indentations disposed about a lateral surface, wherein said indentations extend radially, wherein said rectangular element hits an inner wall of said indentations when is rotated to produce noise, said rectangular element rotates when elliptically moving said handle, said central element is made of a hockey puck.

* * * * *